(No Model.)
P. M. MELICK.
SLEEPING CAR.
No. 248,106. Patented Oct. 11, 1881.
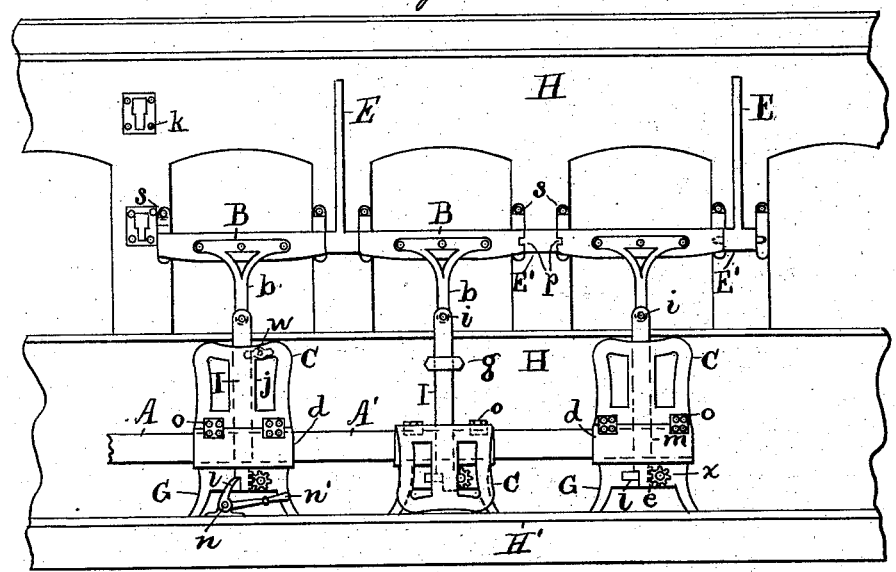
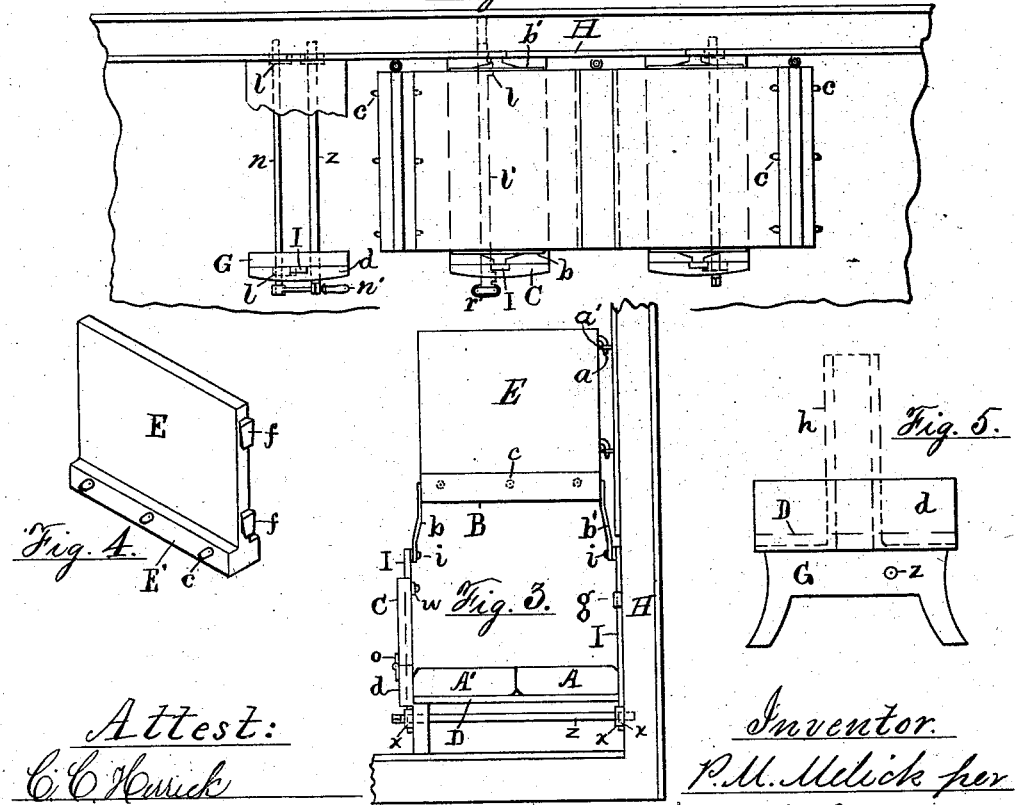
Attest:
C. C. Herrick
Ed. W. Woodruff
Inventor.
P. M. Melick per
J. S. Crane atty.

UNITED STATES PATENT OFFICE.

PETER M. MELICK, OF NEWARK, NEW JERSEY.

SLEEPING-CAR.

SPECIFICATION forming part of Letters Patent No. 248,106, dated October 11, 1881.

Application filed September 1, 1881. (No model.)

*To all whom it may concern:*

Be it known that I, PETER M. MELICK, a citizen of the United States, residing in the city of Newark, county of Essex, and State of New Jersey, have invented certain new and useful Improvements in Sleeping-Cars, fully described and represented in the following specification and the accompanying drawings, forming a part of the same.

My invention relates to an improvement in Letters Patent No. 245,004, issued to me August 2, 1881, for a style of sleeping-couch formed by turning up the backs of the seats of ordinary railroad-cars and unfolding the seat-cushions; and it consists in the improved means herein shown and described for increasing the space above the seat-cushions, and for obtaining access to the lower couch.

In the drawings annexed, Figure 1 is a view of the interior of a car provided with my improvements, looking toward the side of the car, the view embracing three seats. Fig. 2 is a plan of three seats, the back being removed from the one at the left of the view and a part of the seat-platform broken away to show the stop more plainly; and Fig. 3 is a sectional end elevation of part of the bottom and side of a car having one seat and its back arranged for use as a couch. Fig. 4 is a perspective view of the partition E, and Fig. 5 is an enlarged view of the iron leg.

The parts shown in my former patent are the cushions A A', back B, arm C, platform D, braces *b*, and catches *s*.

The improvements consist in a new construction for the arm C, whereby it may be turned down bodily to afford access to the lower couch, and in the combination, with the braces *b*, of lifting-bars arranged to elevate their pivots *i*, and thus sustain the backs B at a greater distance from the lower couch.

The arm C is made separate from the end piece of the platform D, and is formed preferably with a center post, *j*, to strengthen it, and is secured by hinges *o o* and catch *u* in an upright position upon the end piece, *d*. The hinges permit the whole arm to be turned down, as shown in the middle seat of Fig. 1, and abundant room is thus afforded for access to the couch formed of cushions A A'.

As usually constructed, the pivot *i*, upon which the brace of the back turns, is secured permanently to the arm C, and would prevent the same from being turned down in the manner shown; but the pivot in my improved construction is transferred to the upper end of a lifting-bar, I, which is arranged vertically in the end of the platform inside the arm, and constructed to be raised by any suitable mechanism, so as to lift the brace and back B to a higher point than the arm-rest C affords.

The lower end of the lifting-bar is shown provided with teeth arranged in a rack at *e*, and a pinion, *x*, mounted upon a shaft, *z*, is arranged to raise and lower the bar when the shaft is turned by a key or crank fitted to its outer end.

The lifting-bar for the front brace, *b*, is steadied by a suitable socket formed in the leg G, while the bar for the rear brace, *b'*, is steadied also by a guide, *g*, applied to the side of the car H, just below the pivot *i*, when the brace is in its lowest position.

To prevent the bar from interfering with the movement of the seat-cushions, it is preferably sunk in a groove formed in the inside of the end *d* and arm C; and to strengthen the bar to the highest possible point a metallic socket may be projected upward from the leg G and the center post, *j*, in the arm omitted. The catch *w* may be arranged in any suitable manner to hold the bar in the groove in the arm C, and is shown in the drawings as formed by a button secured to the arm-rest. A sliding bolt would also serve the same purpose.

To retain the bars I when raised by the pinions *x* or other suitable mechanism, I provide a stop, *l*, which may be made of pawl form and engage the teeth of the rack I or pinion *x*; or it may be made on a slide and arranged to be pushed under a shoulder in the bar I when the latter is fully elevated.

At the top of Fig. 1 and in Fig. 2 is shown the arrangement for two pawls secured to a shaft, *n*, extending under the platform D, so as to operate upon both front and rear racks at once and be disengaged from them with facility by lifting a hand-lever, *n'*, attached to the front end of the shaft.

The stops are shown secured to a slide, *l'*, in

Figs. 1 and 2, the slide being a rod arranged in bearings horizontally under the platform D and provided with a handle, r, at the front end, by which it can be moved in and out at pleasure. By either device the bars I are sustained in their elevated position with security and easily released when they need to be lowered.

To prevent interference of the occupants with one another I have devised a removable partition, E, which consists in a board provided with metallic fastenings to secure it strongly to the side of the car at the junction of two seat-backs, and formed with pins or other means of engaging the edges of the backs and affording them a vertical support.

In Figs. 2 and 3 the partition is shown secured to the wall of the car by projecting hooks and eyes, as $a$ $a'$; but metallic sockets may be fitted flush in the side of the car, as indicated at $k$, in Fig. 1, and projecting tongues fitted to the rear of the partition, as shown at $f$ in Fig. 4.

The projections upon the lower edge of the partition to sustain the seat-backs may be made by forming a tongue to fit in a groove in the edge of the back, or by providing the edges at opposite sides of the bottom of the partition with pins, as at $c$ $c$, and applying brass plates with holes in them to fit the pins to the edges of the backs adjacent to the partition.

In cases where the seats are too narrow to touch the partition when turned up the latter may be provided with a transverse strip, E', at the bottom, of suitable width to touch the adjacent backs, as shown in Figs. 1, 2, and 4, and the pins be inserted in the edge of such strip.

At points where no partition is required in the couch a strip, E', would be inserted between the edges of the adjoining backs, and retained in place by pins or by tongues and grooves, as shown at $p$ in Fig. 1. If the inner end of such separate strip be secured to the wall of the car by suitable fastenings, as described for the partition E at $a$ and $f$, it is obvious that it will effectually prevent any lateral or vertical movement of the backs B.

From the above description it will be seen that my improvements consist, essentially, of lifting-bars operated to raise the pivots $i$, by the use of which lifting-bars the pivots become detached from the arms C, and the latter adapted to turn down when desired, and in a partition or loose strip, E', adapted to be readily attached and detached from the side of the car, and aiding very materially when in place to sustain the seat-backs in both vertical and horizontal directions.

I am aware that other means have been used for making seats operate as couches, and for sustaining the backs of the seats when turned up in a horizontal position, as the hanging rods shown in Patent No. 57,198, of 1866, and the cogged plates and slotted bars shown in Patent No. 21,967, of 1858; and I do not therefore claim any means for accomplishing such object except those herein shown, which I deem superior to those heretofore devised from their simplicity and neatness.

I therefore claim my invention as follows:

1. The combination, with the backs B, braces $b$, and pivots $i$, of the bars I, carrying the pivots, and provided with racks $e$ at their lower ends, and fitted in sockets in the platform or leg, as described, the pinions $x$ and shaft $z$, arranged below the platform D and operating to raise the lifting-bars I, as described, and the stops $l$, arranged and operated to sustain the rods I when elevated, substantially as and for the purpose set forth.

2. In combination with the platform D, back B, and leg G, the rods I, carrying the back B by the pivots $i$, as and for the purpose described, and arranged in sockets in the platform or leg, and provided with mechanism for lifting, substantially as described, and the arm C, hinged to end piece, $d$, by a horizontal joint, and arranged so that the entire arm above the seat-cushions may be turned downward and outward, substantially as and for the purpose set forth.

3. In combination with the wall of the car and the backs B, turned up in the manner described, the partition E, constructed and secured to the side or wall of the car in the manner set forth, and provided with a strip, E', at the bottom to fill the space between the edges of the adjacent backs, as herein shown and described.

4. The combination, with the wall of the car and the backs B, turned up in the manner described, of a strip, E', secured to the wall of the car and serving to fill the space between the adjoining backs, substantially as set forth.

5. In combination with the partition E or strip E', secured removably to the wall of the car, the means for connecting the same to the edges of the upturned backs B, as at $c$ or $p$, and thereby supporting or bracing the backs in a horizontal position, as herein shown and described.

In testimony whereof I have hereunto set my hand in the presence of two subscribing witnesses.

PETER M. MELICK.

Witnesses:
   THOS. S. CRANE,
   H. THEBERATH.